United States Patent [19]
Rocksvold

[11] 4,022,490
[45] May 10, 1977

[54] TURRET-TYPE HITCH UNIT FOR PICKUP TRUCKS

[75] Inventor: Alvin N. Rocksvold, Woodland, Calif.

[73] Assignee: Marvin Landplane, Woodland, Calif.

[22] Filed: Feb. 17, 1976

[21] Appl. No.: 658,625

[52] U.S. Cl. ............................ 280/500; 280/504
[51] Int. Cl.² .................................. B60R 21/00
[58] Field of Search .......... 280/504, 500, 514, 515

[56] References Cited
UNITED STATES PATENTS 2,827,307  3/1958  Osborn ........................... 280/504
3,480,296  11/1969  Starling ........................... 280/500

Primary Examiner—Robert R. Song
Attorney, Agent, or Firm—Roger B. Webster

[57] ABSTRACT

A hitch unit for pickup trucks which provides—in a somewhat turret-like, rear bumper-mounted, rotary array—three types of hitches (ball, hinged clevis, and rigid clevis) arranged so that a selected hitch may be manually, quickly, and without the use of tools, brought to an exposed or use position projecting rearwardly from the bumper. In each such position, the rotary array of the hitch unit is locked against accidental displacement.

3 Claims, 4 Drawing Figures

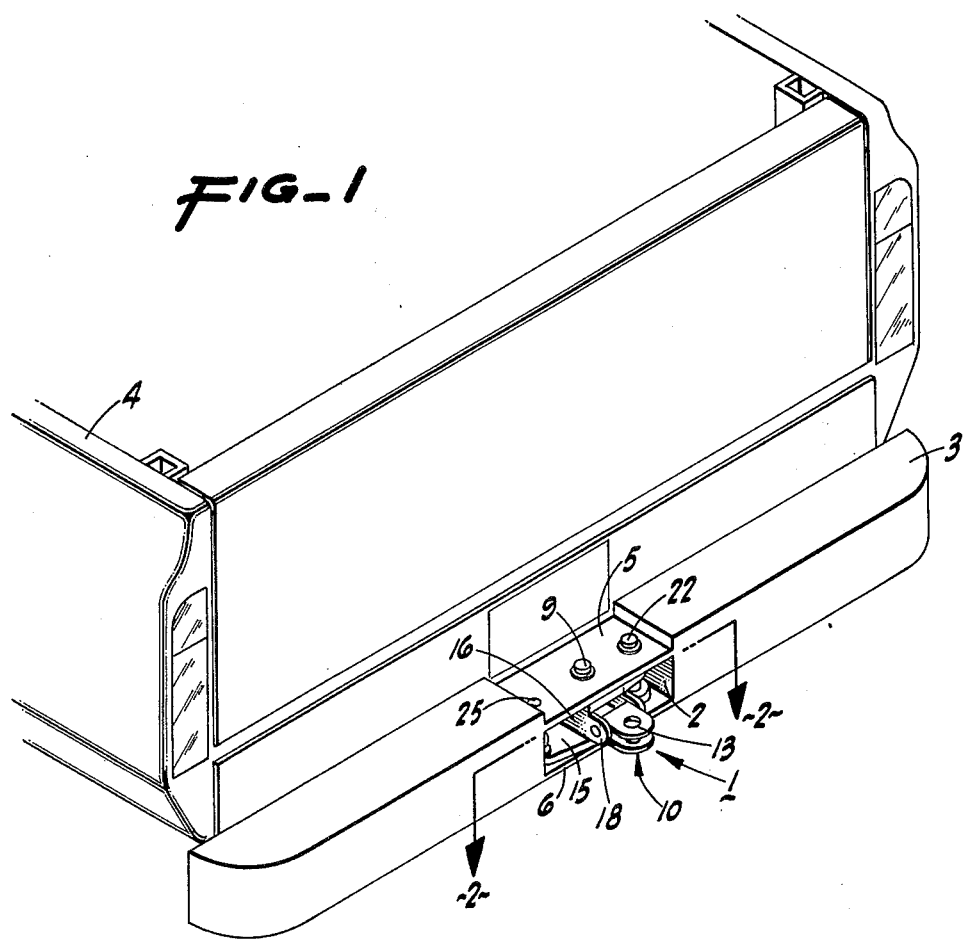
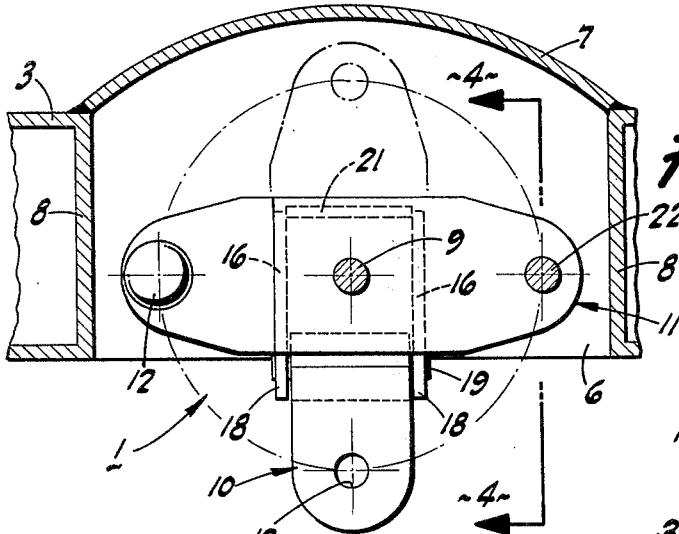
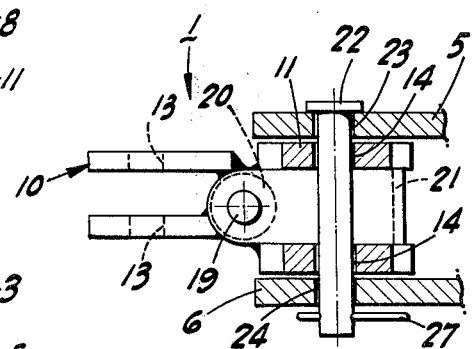
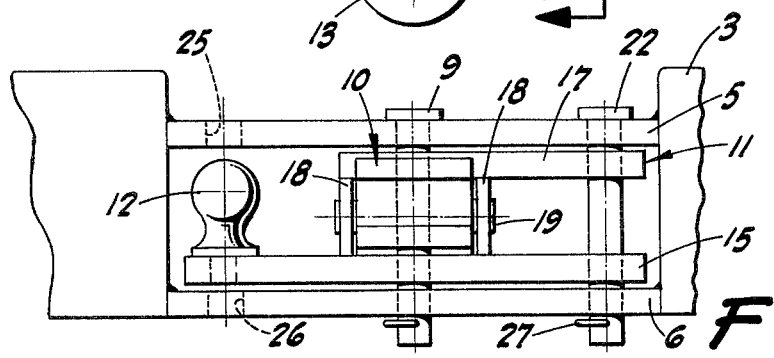

TURRET-TYPE HITCH UNIT FOR PICKUP TRUCKS

BACKGROUND OF THE INVENTION

In industrial use of pickup trucks, different types of rear bumper-mounted hitches are frequently needed for coupling with, and trailing, wheeled work equipment. The common practice, at present, is to unbolt one type of hitch and mount another on the rear bumper when a hitch change is required. The present invention was conceived in a successful effort to avoid such inconvenience, while at the same time making available different types of hitches.

SUMMARY OF THE INVENTION

The present invention provides, as its major object, a hitch unit for pickup trucks which provides—in a somewhat turret-like, rear bumper-mounted, rotary array—three types of hitches (ball, hinged clevis, and rigid clevis) arranged so that a selected hitch may be manually, quickly, and without the use of tools, brought to an exposed or use position projecting rearwardly from the bumper. In each such position, the rotary array of the hitch unit is locked against accidental displacement.

The present invention provides, as a further object, a turret-type hitch unit for pickup trucks which is designed for ease and economy of manufacture and ready installation.

The present invention provides, as a still further object, a practical, reliable, and durable turret-type hitch unit for pickup trucks, and one which is exceedingly effective for the purpose for which it is designed.

BRIEF DESCRIPTION OF THE DRAWINGS

FIG. 1 is a perspective view of the hitch unit as embodied in the rear bumper of a pickup truck; the hinged clevis being shown in a rearwardly projecting position for use.

FIG. 2 is an enlarge sectional plan view taken substantially on line 2—2 of FIG. 1.

FIG. 3 is a rear elevation of the hitch unit as in FIG. 1.

FIG. 4 is a transverse sectional elevation taken substantially on line 4—4 of FIG. 2.

DESCRIPTION OF THE PREFERRED EMBODIMENT

Referring now more particularly to the drawings and to the characters of reference marked thereon, the hitch unit, indicated generally at 1, is mounted in a rearwardly opening, rigid pocket 2 formed in the rear bumper 3 of a pickup truck 4. The pocket 2 is defined by a horizontal top plate 5, a horizontal bottom plate 6 spaced therebelow, a curved back wall 7, and ends 8.

The hitch unit 1 is a rotary array—turnable about a central verical pin 9—which includes, with 90° circumferential spacing, hitches in the form of a hinged clevis, a rigid clevis, and a ball, indicated at 10, 11, and 12, respectively. The hinged clevis has vertically alined, pin-receiving holes 13 therein, while the rigid clevis is formed with vertically alined pin-receiving holes 14.

The particular structure of the roatary array which supports, and in part forms, the several hitches (10, 11, and 12) comprises the following:

A flat, horizontal, lower bar 15 extends—at the bottom of the rotary array—radially and equally in opposite directions from the central pin 9, and through which bar said pin extends as a pivot.

One radially projecting end portion of the lower bar 15 forms the lower ear of the rigid clevis 11, while the other and oppositely radially projecting portion of said bar 15 provides the mount for the upstanding ball 12.

A pair of vertical webs 16 are fixed transversely on, and upstand in spaced parallel relation, from the bottom bar 15; such webs being disposed with the pin 9 in centered relation therebetween.

A flat, horizontal, upper bar 17 is rigidly secured on and spans between the top edges of the webs 16; such upper bar 17 projecting only in one direction from the webs 16 for the purpose of forming the upper ear of the rigid clevis 11. The central pin 9 extends through the upper bar 17 intermediate said webs 16.

At one end, the webs 16 include rigid tongues 18 which project laterally outwardly beyond the vertical plane of the bars 15 and 17; there being a cross pin 19 between such tongues, and which cross pin carries the pivot sleeve 20 of the hinged clevis 10. At the end opposite the tongues 18, the webs 16 are connected by a back wall 21.

When the above-described hitch unit is adjusted with the hinged clevis 10 exposed and projecting rearwardly for use as shown in FIG. 1, the hitch unit is held against rotation by means of a locking pin 22 which extends through alined holes 14 in the ears of the rigid clevis 11 and corresponding alined holes 23 and 24 in the top plate 5 and bottom plate 6, respectively.

Upon the locking pin 22 being removed, the hitch unit—for use of the rigid clevis 11—is manually rotated 90° clockwise to expose and position said rigid clevis 11 in rearward projection for use; the locking pin 22 then being passed through the alined holes 13 in the hinged clevis 10 and corresponding alined holes 25 and 26 in the top plate 5 and bottom plate 6, respectively, and between which plates said hinged clevis is now disposed.

When it is desired to use the hitch ball 12, the hitch unit—after removal of the locking pin 22—is rotated 90° counter-clockwise (from the FIG. 1 position) until said ball 12 is exposed to the rear of the bumper; the locking pin then being replaced by passing it through the alined holes 13 of the hinged clevis 10 and corresponding alined holes 23 and 24, respectively, in the top plate 5 and bottom plate 6, and between which plates said hinged clevis is now disposed.

When not needed for use, the entire hitch unit is rotated (180° from the FIG. 1 position) until the hinged clevis 10, rigid clevis 11, and ball 12 are all confined in the pocket 2; the hitch unit is thn locked in such out-of-use and protected position by passing the pin 22 through either the alined holes in clevis 10 or clevis 11 and the related alined holes in the top plate 5 and bottom plate 6.

As shown, a removable cotter key 27 or the like may be employed to prevent accidental escape of the locking pin 22 from its working position. The central pin 9 is similarly retained.

By the simple expedient of manual adjustment, the above-described hitch unit can be readily and quickly positioned for use, selectively, of any one of the three hitches, or all can be disposed within the confines of pocket 2 and hence protected against damage when not in use.

From the foregoing description, it will be readily seen that there has been produced such a turret-type hitch unit for pickup trucks as substantially fulfills the objects of the invention as set forth herein.

While this specification sets forth in detail the present and preferred construction of the turret-type hitch unit for pickup trucks, still in practice such deviations from such detail may be resorted to as do not form a departure from the spirit of the invention as defined by the appended claims.

I claim:

1. A hitch unit comprising, in combination with a vehicle bumper having a horizontally outwardly opening pocket therein intermediate its ends, a rotary structure pivoted in the pocket for vertical axis rotation, a rigid hitch, a ball hitch, and a swinging hitch included with the rotary structure in circumferentially spaced relation about said axis and radially outwardly thereof, each hitch in a corresponding predetermined rotative position of said rotary structure being out of the pocket and exposed rearwardly of the bumper for use, and means to releasably lock the rotary structure in said predetermined positions, selectively; the rotary structure including a bar having opposite end portions projecting beyond said axis, one projecting end portion of the bar comprising the rigid hitch in part, the ball hitch being mounted on the other projecting end portion of such bar, the swinging hitch projecting laterally from the bar substantially centrally of its ends, and means mounting the swinging hitch in connection with the bar vertical swinging motion when disposed out of the pocket for use; the rotary structure additionally including another bar above said first-named bar, and said other bar having an end portion which projects in spaced, overhanging relation to said one projecting end portion of such first-named bar, such end portions of the bars forming, of clevis type, said rigid hitch.

2. A hitch unit comprising, in combination with a vehicle bumper having a horizontally outwardly opening pocket therein intermediate its ends, a rotary structure pivoted in the pocket for vertical axis rotation, a plurality of differently characterized hitches included with the rotary structure in circumferentially spaced relation about said axis and radially outwardly thereof, each hitch in a corresponding predetermined rotative position of said rotary structure being out of the pocket and exposed rearwardly of the bumper for use, and means to releasably lock the rotary structure in said predetermined positions, selectively; the rotary structure including a lower bar having opposite end portions projecting beyond said axis, one projecting end portion of said lower bar forming the lower ear of a rigid clevis hitch, a ball hitch mounted on the other projecting end portion of said lower bar, an upper bar having an end portion which projects in spaced, overhanging relation to said one projecting end portion of the lower bar and forms the upper ear of the rigid clevis hitch, and transversely spaced, upstanding webs rigidly secured between the lower bar and the upper bar, the webs being disposed on opposite sides of the axis of said rotary structure, and corresponding ends of the webs forming tongues projecting laterally from such rotary structure; there being a hinged clevis hitch pivotally connected to and projecting outwardly from said tongues.

3. A hitch unit comprising, in combination with a vehicle bumper having a horizontally outwardly opening pocket therein intermediate its ends, a rotary structure pivoted in the pocket for vertical axis rotation, a rigid hitch, a ball hitch, and a swinging hitch included with the rotary structure in circumferentially spaced relation about said axis and radially outwardly thereof, each hitch in a corresponding predetermined rotative position of said rotary structure being out of the pocket and exposed rearwardly of the bumper for use, and means to releasably lock the rotary structure in said predetermined positions, selectively; the rotary structure including upper and lower bars having end portions projecting radially in one direction away from said axis and forming the rigid hitch, the lower bar having an oppositely projecting end portion, the ball hitch being mounted on said oppositely projecting end portion of the lower bar, spaced tongues projecting laterally from said bars, and the swinging hitch being pivotally connected to and projecting outwardly from said tongues.

* * * * *